United States Patent [19]

Berkovich

[11] Patent Number: 5,428,773
[45] Date of Patent: Jun. 27, 1995

[54] RETRIEVAL OF INFORMATION FROM LATTICE-STRUCTURED CONTENT-ADDRESSABLE MEMORIES BY CONCURRENTLY SEARCHING IN OPPOSING DIRECTIONS

[75] Inventor: Semyon Berkovich, Rockville, Md.

[73] Assignee: AlliedSignal Inc., Morris Township, Morris County, N.J.

[21] Appl. No.: 988,582

[22] Filed: Dec. 10, 1992

[51] Int. Cl.$^6$ ............................................. G06F 17/30
[52] U.S. Cl. .................................... 395/600; 395/425; 395/800; 364/974.6; 364/963.1; 364/230.4; 364/253.1; 364/DIG. 1; 364/DIG. 2
[58] Field of Search ...................... 395/425, 600, 800; 365/49

[56] References Cited

U.S. PATENT DOCUMENTS 3,938,105 2/1976 Lechner .............................. 395/400
4,996,666 2/1991 Duluk ................................... 365/49

OTHER PUBLICATIONS

Huang et al., "An Evaluation of Concurrent Priority Queue Algorithms", *Parallel and Distributed Processing*, Jan., 1991, pp. 518–525.
Nelson et al., "Unidirectional and Bidirectional Search Algorithms", *IEEE Software*, vol. 9, No. 2, Mar., 1992, pp. 77–83.
Chung et al., "On the Complexity of Search Algorithms", *IEEE Transactions on Computers*, vol. 41, No. 9, Sep., 1992, pp. 1172–1176.
Simon Y. Berkovich "Organization of Associative Memory Operations with Lattice Structures", *Proceedings of the 35th Midwest Symposium on Circuits and Systems*, 9–12 Aug. 1992, pp. 887–890.
C. L. Liu, *Elements of Discrete Mathematics*, McGraw-Hill Book Company, (New, York, 1985), pp. 103–125, 385–407.
*IBM Personal Computer Professional FORTRAN Version 1.30 Reference Manual*, Ryan-McFarland Corporation, 1987, pp. 1–26 to 1–27.
Bart Kosko, "Bidirectional Associative Memories", *IEEE Transactions on Systems, Man, and Cybernetics*, vol. 18, No. 1, Jan.–Feb., 1988, pp. 49–60.
Dieter Muller, "Symmetric Connection Problems and Their Solution by Bidirectional Search", *International Journal of computer Mathematics*, vol. 37, No. 3–4, 1990, pp. 137–152.
Donald R. Mack, "The Magical Fibonacci Number", *IEEE Potentials*, vol. 9, No. 3, Oct., 1990, pp. 34–35.
*The Art of Computer Programming*, vol. 3–"Sorting and Searching", 1973, Addison-Wesley Publishing Company, Inc. pp. 48–58.
"Efficient Parallel Algorithms for Selection & Searching on Sorted Matrices" Sarnath et al. Proceedings–*Sixth International Parallel Processing Symposium*, Mar. 23–26, 1992 Beverly Hills, Calif., IEEE Computer Society pp. 108–111.
"An Emperical Comparison of Priority-Queue and Event-Set Implementations", Douglas W. Jones, *Communications of the ACM*, Apr. 1986, vol. 29, No. 4 pp. 300–311.
"Analysis of Algorithms and Data Structures", Banachowski, et al, Institute of Informatics, Addison-Wesley (Reading, Mass.) 1991 pp. 121–134, 293.

Primary Examiner—Thomas G. Black
Assistant Examiner—Paul R. Lintz
Attorney, Agent, or Firm—Howard G. Massung

[57] ABSTRACT

An information processing unit having a memory (16) storing a set of data elements in a data lattice structure. The memory is content-addressably searched by a pair of processors (12) and (14) controlling confronting traversals of the data lattice structure. A traversal controller (24) generates a search routine for the two processors (12) and (14) resulting in a natural two-way concurrency in their operation. A second memory (22) stores processing instructions and pointers used by the traversal controller (24) to generate the search routine. The processing instructions and pointers are extracted from the second memory under the control of processors (18) and (20). An interface processor (26) is connected to a communication link (28) connecting the information processing unit to utilization devices.

11 Claims, 2 Drawing Sheets

RETRIEVAL OF INFORMATION FROM LATTICE-STRUCTURED CONTENT-ADDRESSABLE MEMORIES BY CONCURRENTLY SEARCHING IN OPPOSING DIRECTIONS

TECHNICAL FIELD

The invention is related to the field of information processing units for real-time control systems and, in particular, to information processing units having content-addressable capabilities.

BACKGROUND ART

Normally, a computer in an information processing system operates by accessing data items through their location in a memory. Efficient implementation of many computer algorithms require accessing data items through their content. Content-addressable data access can be realized in a variety of different ways. The importance of this problem has stimulated intensive investigations of specialized hardware which includes such exotic technologies such as holography and superconductivity. However, because of technological constraints, memories with content-addressable access, provided by hardware, have found limited applications.

In conventional processors, to access data by means of their content, is executed by software searching techniques. The simplest form of this type of searching technique is a sequential search of the data stored in the memory. In the sequential search method, target key or target data element is retrieved by scanning a memory storing a given collection of data, until data matching the target key is found. Insertions of new data into the given collection of data and deletion of data from the given collection in this type of memory is straight forward. Unfortunately, this method of searching for desired data is too slow for many applications. The most effective methods to date are based on balancing binary trees having a theoretically optimal logarithmic performance. However, this method is very complex and includes a substantial overhead. In the case of an internal memory of a limited size, this overhead prevents this method from enjoying, in practice, the benefits of their theoretical asymptotic optimality.

The information processing unit described herein employs a new method of organization searching procedures based on a lattice data structure. This searching procedure has an extremely simple operational scheme comparable to that of the sequential search. The algorithm principles underlying this information processing unit have been developed by L. Banachowski, A. Kreczmar and W. Ryetec in their book, "Analysis Of Algorithms And Data Structures" published by Addison-Wesley Publishing Company, Workingham England, 1991, using an implicit data structure called a biparental heap.

SUMMARY OF THE INVENTION

The invention is an information processing unit having at least a first memory storing a set of data elements in a predetermined lattice structure and means for a content-addressable search in the lattice structure for a target data element by confronting traversal of the first memory from opposing locations. The lattice structure is a partially ordered triangular lattice in which the data elements are sorted in an increasing order from left-to-right and from bottom-to-top. The means for content-addressable searching consists of two processors controlling confronting traversals of the data lattice structure in confronting directions from opposing locations in the lattice structure.

One advantage of the disclosed information processing unit is that the confronting searching traversals of the data lattice structure creates an anti-chain dividing the lattice into two subsets with smaller and greater values than a target element.

Another advantage is that mapping into a one-dimensional array that makes the information processing unit simple and fully compatible with the current practices of processing data arrays.

Another advantage is that the processing procedures are very simple.

Still another advantage of the information processing unit is that it allows freer usage of content-addressable operations.

A final advantage is that the hardware and associated software of the information processing units are transparent to the user.

These and other advantages of the information processing unit can be recognized from a reading of the detailed description of the invention in conjunction with the drawings and the programs contained therein.

DETAILED DESCRIPTION OF THE INVENTION

Figure 1:
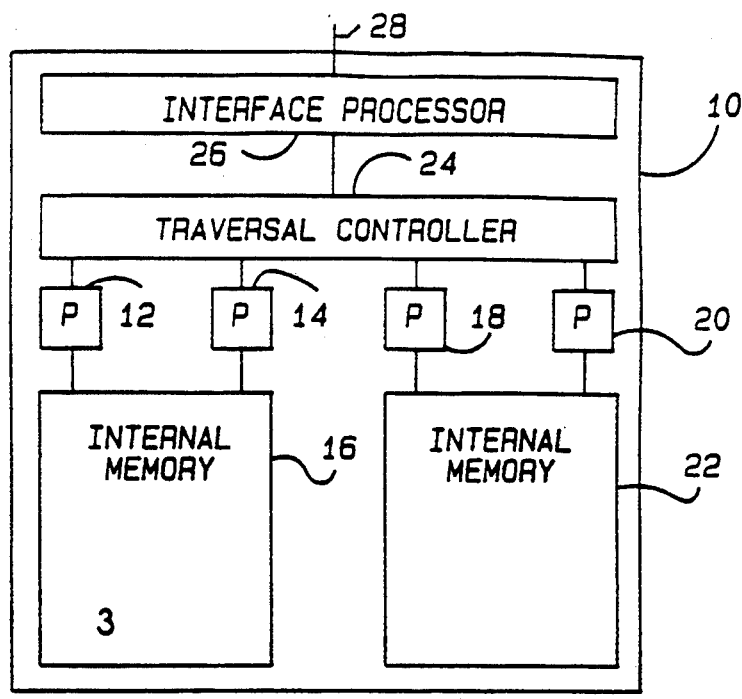
FIG. 1 is a block diagram showing the major components of the information processing unit.

The structure of the information processing unit with content-addressable capabilities 10 is shown in FIG. 1. The essential part of the information processing unit 10 is a first duplex of processors 12 and 14 connected to a first internal memory 16 storing therein a collection of data in a lattice structure. The information processing unit 10 also has a second duplex of processors 18 and 20 connected to a second internal memory 22 storing processing instructions. The second internal memory 22 may also store pointers identifying locations in the first internal memory 16. The duplex of processors 12, 14, 18 and 20 operate in a mode interleaving the access to first internal memory 16 storing the collection of data and the access to the second internal memory 22 storing processing instructions and/or pointers as described above. The use of two working processors, instead of one, brings such an organization many straight forward benefits in terms of performance and reliability. The special benefit of this construction is provided by a traversal controller 24 which manages the comparison and guidance function of the lattice search procedure as shall be described hereinafter. An interface controller 26 provides the required interface between the information processing unit 10 with a processing system and/or utilization device (not shown) via communication link 28.

The hardware support provided by the traversal controller 24 develops the lattice search routine of the lattice data structure of internal memory 16. The lattice search routine incorporates a natural two-way concurrency in operation. This two-way concurrency involves determining the choice of direction of the search by comparison of the values of two neighbor elements with a target key T, and the search is executed by two confronting traversals. If organized with ordinary search procedures, such as a binary search or a balanced binary tree search, the two-way concurrency would not be as beneficial as the lattice search, described hereinafter, because the comparisons are done with an element in one current mode only and the use of two simultaneous searches would mean splitting the retrieval set. This splitting of the retrieval set is less effective at least from a fault-tolerance standpoint.

Figure 2:
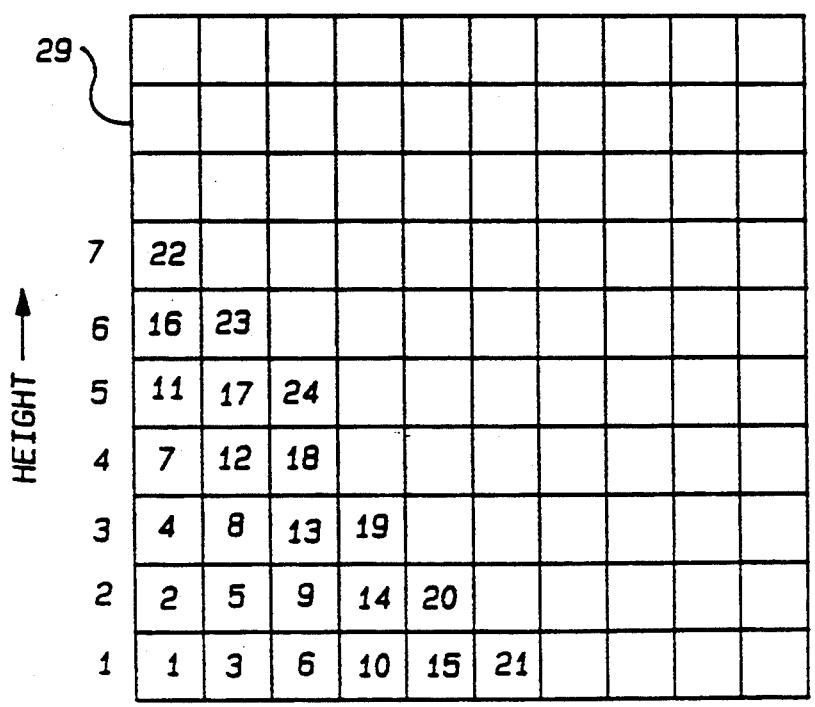
FIG. 2 is a graph showing the data lattice structure of internal memory 16.

The data structure of the first internal memory 16 is similar to the Young tableau discussed by D. E. Knuth in "The Art of Computer Programming", Vol. 3, Addison-Wesley Publishing Company, Reading, Mass., 1973. The data structure may be viewed as a partially ordered set, called a data lattice. The structure 29 of such a data lattice is shown in FIG. 2. It is assumed that the values of the elements contained in the nodes of this lattice are inherently totally ordered. However, interconnections of the lattice nodes reveal only a partial ordering of the element values, i.e. the relationship between certain pairs of elements cannot be determined from their location.

For the sake of simplicity, imagine that these elements are distinct positive integer numbers with ordinary "less than or equal to" ($\leq$) relationships, and that the rows and columns of this lattice are sorted in an ascending order in left-to-right and bottom-to-top directions as shown in FIG. 2. All nodes on any path going right and up form a chain of elements arranged in an increasing order. Any subset of nodes which cannot be connected with such a right and up path form an anti-chain. An anti-chain is a collection of incompared elements.

Figure 3:
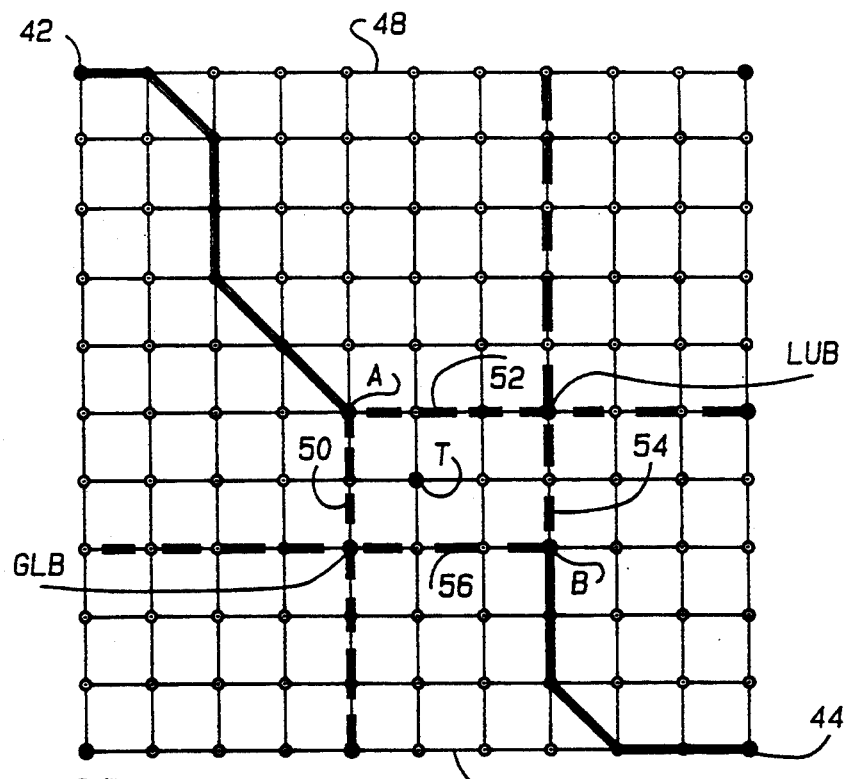
FIG. 3 is a graph used in explaining the details of the confronting search traversals.

For example, a pair of incompared elements, elements A and B shown in FIG. 3, are part of a partially ordered set of data having a "greatest lower bound" ("GLB") and an "upper lower bound ("ULB"), as shown. The two-dimensional data lattice of FIG. 3 has two distinctive elements, 42 and 44, identified as the left and right margins, respectively. The left margin 42 is the complement of the right margin 44, and their greater lower bound (GLB) and lower upper bound (LUB) correspond to the universal lower bound 46 and the universal upper bound 48. The universal lower and upper bounds 46 and 48, respectively, and the left and right margins 42 and 44, respectively, form a rectangle encompassing all of the nodes in the data lattice.

Let us now consider how a target element, T, can be located by traversing the lattice structure. The lattice search will be initiated by a traversal initiated from one of the margin elements, for example, the left margin 42. A confronting traversal from the right margin 44 develops analogously. In the traversal starting from the left margin 42, each move is composed of steps in right and down directions. An accessed element is compared with the target element, T, to determine whether the traversal has ended in success, i.e. target element T has been found. Otherwise, a step in right and/or down direction is made to exclude a part of nodes from further considerations. The excluded nodes are those to the left and those above the accessed element. The choice of the direction is based on the comparison of T with neighbor elements at right, R, and down, D. Since D is always less than R, as apparent from FIG. 2, three situations may exist: (1) D<T and R<T; (2) D<T and T<R; (3) T<D and T<R. In the first case, all the elements in the column below the current accessed element are dominated by T and this column can be excluded; elements to the right of the accessed element cannot be excluded and the traversal should proceed to the right. In the third case, elements in the row to the right of the accessed element have D as their lower bound; since T is less than D, these right row elements may then be excluded; elements in the column below the accessed element cannot be excluded and the traversal should proceed down. In the second case, all the elements in the column below the accessed element are dominated by T while all the elements in the row to the right of the accessed element dominate T; therefore, these rows and the column both may be excluded from further consideration and the traversal should proceed diagonally downwards.

The traversal navigational rule can be summarized as follows:

If (D<T) and (R<T) THEN traverse Right;
If (D<T) and (T<R) THEN traverse Diagonally; and
If (T<D) and (T<R) THEN traverse Down.

As can be seen in FIG. 3, the non-excluded elements in the traversal starting from the left margin 42 form a rectangle framed by the dotted lines 50,52 going out of the current accessed element A and the opposite border lines going out of the right margin. An analogous rectangle framed by dashed lines 54 and 56 is the confronting traversal which started from the right margin 44. Thus, this process will end up in one of two results: finding the target key "T" or stopping on the boundary line, left-vertical or top-horizontal. In a quadratic lattice, the traversal procedure will take no more steps than twice of its border line length.

Searching Traversal Theorem

A searching traversal of a two-dimensional lattice initiated from the left margin in accordance with the traversal navigational rule will locate a target (key) element or establish its absence in a number of steps approximately proportional to $$\sqrt{N}$$

With a corresponding navigational rule, the same statement is true for the searching traversal starting from the right margin.

A searching traversal which fails to find the target element "T" in the lattice reaches one of the opposite border lines at a point between a lower and an upper bound of the target element. When a searching traversal finds the target element "T" it stops. However, if continued, it would end up in the same way as in the case of an unsuccessful traversal. A traversal going through the whole lattice from a margin to an opposite border line is called a complete traversal. The searching traversal theorem leads to two important corollaries.

Corollary on Nearest Neighbors

The immediate predecessor and the immediate successor of a target element "T" can be found in the nodes of a complete searching traversal or among the elements in the nodes adjacent to them.

The correctness of this statement comes from the fact that a searching traversal with an immediate predecessor or immediate successor of a target element will go along exactly the same way as the searching traversal with the target element itself.

Corollary on Coinciding Paths

Complete traversals searching for the same target which are initiated from the right and left margins follow identical paths within the lattice.

To get a practical usage of the above described data structure concepts, it is necessary to provide an effective mapping of the two-dimensional data lattice into computer memory maintaining partial ordering relationships in a dynamically changing environment.

In the data lattice structure 29 shown in FIG. 2, there is a possibility of varying the subsets of nodes in order to satisfy different mapping requirements. We can imagine that the data lattice accommodate a given set of keys of arbitrary shape as soon as this set is surrounded by minimum and maximum elements; if keys are positive numbers, those can be 0 and a preestablished bordering elements of maximum values called M A X I N T. For this subset of nodes, the presented searching traversals can be effective as for the whole lattice, provided that these traversals were initiated from margins whose greater lower boundary, GLB, and lower upper boundary, LUB, encompass this subset. The choice of an appropriate subset of nodes for using in searching procedures includes the following factors. First, for a set of a given size, its diameter has to be as small as possible to minimize the worst case behavior of searching. Second, there should be simple rules for accessing the neighbor elements and for testing the boundaries of the subset. And third, this subset has to be adequate for maintenance operations.

Figure 4:
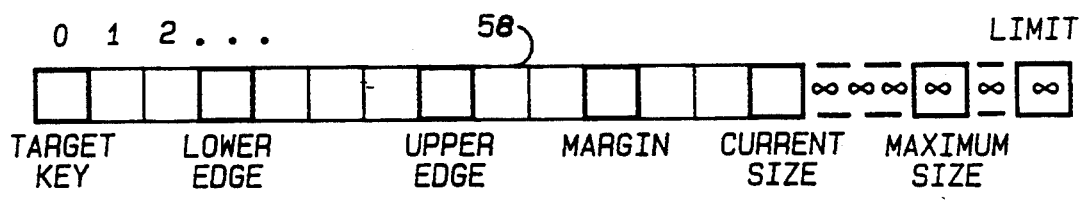
FIG. 4 shows the details of the triangular mapping of the data lattice into a one-dimensional array.

The most common representation of a set of data items is one-dimensional array. In the dynamic case, provided that searching facilities are maintained, the growth and shrinking of a set would simply imply changing the size of the array. An analysis of this problem concluded that a rather perfect shape for a dynamic set is a "triangle" which maps the lattice elements into a one-dimensional array 58 as shown in FIG. 4. Besides the concurrence of this mapping with the above requirements, it also has an extremely important property that accommodating a sorted array simultaneously complies with the ordering conditions of the lattice.

To perform searching operations, we need a starting reference position of the left margin, $M_1$, and a calculational rule to proceed from a cursor point, C, to the positions of its up, down, right and left neighbors, U, D, R, and L. First of all, it is necessary to determine the height, h, of the triangular structure as a function of the size of the array N. Thus, in the data lattice structure shown in FIG. 2, the size of the array is 24 and its height is 7. The height, h, is determined as the largest integer number in the inequality:

$$\frac{h \cdot (h-1)}{2} < N \quad (1)$$

from which h can be found by the formula:

$$h = [\sqrt{2 \cdot N} + 0.5] \quad (2)$$

In floating point computations, this formula may be unreliable when N becomes very large. This formula has been tested with single-precision arithmetic up to N=10,000 and proven to yield the correct results.

With the value of h, we can determine the left margin, $M_1$:

$$M_1 = \frac{h \cdot (h-1)}{2} + 1 \quad (3)$$

In the example shown in FIG. 2, the left margin is equal to (7.6)/2+1 or 22.

The value of h provides a displacement step allowing the neighbors in the 2D environment to be calculated. When the cursor departs from the starting margin, the initial value of h is changing as the accompanying step, s, to enable access to neighbors. All the positions along different hypothenuses of the lattice structure of FIG. 2 have the same displacement step indicated by the left column numbers. Thus, positions [22..24] have s=7, positions [16..21] have s=6, positions [11..15] have s=5, positions [7..10] have s=4, positions [4..6] have s=3, positions [2..3] have s=2, and position [1] has s=1. The positions of the neighbors to the cursor C are determined by the following relationships:

$$U = C + s \quad (4)$$

$$D = D - S + 1 \quad (5)$$

$$L = C - s \quad (6)$$

$$R = C + s + 1 \quad (7)$$

As an example, assume C=8; therefore, s=4, and U= 8+4=12   D=8−4+1=5,   L=8−4=4, R=8+4+1=13.

Implementations of the dynamic search procedures starts with the creation of a working environment for the retrieval and maintenance operations. The suggested lattice structure is arranged in a record whose major component is a large one-dimensional array of data items. The other components contain the status parameters of the mapping construction, represent ordering characterization of data items, and include working parameters for an external element. The dynamic set utilizes a part of the items array of a variable length corresponding to the actual current size of the set. The procedures are developed on the array with the pre-established bordering elements of maximum value, M A X I N T. Using these pre-established bordering elements is only a matter of convenience, not a necessity; instead, one may just insert a layer of bordering elements which will be adjusted dynamically with the growth of the set or check the border conditions through a comparison of the reference pointers with the current size value. The maximum size of the dynamic set should be a little bit less than the maximum size of the array itself, called Limit, so that the right neighbors of the border elements of the set will not be referred to beyond the array boundary. This maximum size can be estimated approximately as:

$$\text{Maxsize} \approx \text{Limit} - 1.5 * \sqrt{2 * \text{Limit}} \quad (8)$$

To avoid recalculations of the status parameters of the triangular construction, the height and the margin are updated to correspond to the actual size of the dynamic set. Thus, to set up an empty lattice having size equal to zero, requires also to assign the initial values for margin, 1, and for height, 0. After execution of this procedure, the lattice is ready to acquire data.

In contrast to most of the other dynamic data structures, the lattice structure can be easily arranged to start with a non-empty set. For this purpose, it is sufficient to load the data into the array in a sorted order. This natural action is a valid initialization by virtue of the suggested triangular mapping scheme where the positions of the elements comply with the ordering requirements of the lattice structure.

The insertion and deletion process involves procedures for fixing lattice structures when one element is substituted by another. The necessity for fixing occurs when: (1) a smaller element replaces a greater element and (2) a greater element replaces a smaller element. Fixing the lattice requires moving the replacing elements inwards in the first case and outwards in the second case. The corresponding procedures are presented below in the Pascal programs, MOVEIN and MOVEOUT.

MOVEIN

MOVEIN replaces in the lattice a greater element with a lessor element:

```
procedure MOVEIN (var Lattice: Table);
    {fixes the structure by moving Lattice.Element
    inwards}
var C, K1, Kd, T1, Td, step: integer;
    {cursor, keys and traps at left and down, 2d
    addressing}
var fixed: boolean;     {termination condition}
BEGIN
    with Lattice do
        Begin
            C:=position; {the starting placement of the
                element}
            step:=Trunc((Sqrt(2*C)+0.5)); {to avoid floating
                point computations passing of this parameter can
                be organized through Lattice.Element.distance}
            T1:=(step*(step-1))div 2+1; {initial positions of
                left}
            td:=T1+step-1; {and down traps}
            fixed:=false;
            REPEAT
                {determining keys of left and down neighbors}
                IF (c=T1) THEN K1:=0 ELSE K1:=items [C-step];
                IF (c=Td) THEN Kd:=0 ELSE Kd:=items [C-step+1];
                IF (value>Kd)and(value>K1) THEN {position is
                    appropriate}
                        begin
                            fixed:=true;
                            items[C]:=value
                        end
                    ELSE {go inwards}
                        begin
                IF (K1>Kd) {choosing direction}
                    THEN begin items [C]:=items[C-step]; C:=C-step end
                    ELSE begin items [C]:=items[C-step+1]; C:=C-step+1
                    end;
                {guiding information is updated unconditionally}
                    step:=step-1; Td:=T1-1; T1:=T1-step
                        end;
            UNTIL fixed
        End
END;
```

MOVEOUT

MOVEOUT replaces in the lattice a smaller element with a greater one:

```
procedure MOVEOUT (var Lattice: Table);
    {fixes the structure by moving Lattice.Element
    outwards}
var C, step: integer; {cursor and step for 2d
    addressing}
var fixed: boolean;     (termination condition)
BEGIN
    with Lattice, Element do
        Begin
            C:=position; {the starting placement of the
                element}
            step:=Trunc((Sqrt(2*C)+0.5)); {to avoid floating
                point computations passing of this parameter can
                be organized through Lattice.Element.distance}
            fixed:=false;
            REPEAT
            IF (value<items[C+step]) and (value<items[C+step+1])
                THEN {position is appropriate}
                    begin
                        fixed:=true;
                        items[C]:=value
                    end
                ELSE {go outwards}
                    begin
            IF items [C+step]<items [C+step+1] {choosing direction}
                THEN begin items [C]:=items[C+step]; C:=C+step end
                ELSE begin items [C]:=items[C+step+1]; C:=C+step+1
                end
                    step:=step+1; {increases unconditionally}
                        end;
            UNTIL fixed
        End
END;
```

The MOVEOUT procedure terminates by comparison with upper border elements and is straightforward. The first procedure has a complication with checking the border lines from the lower side which may be overcome with pointer traps walking along the borders to meet the approaching element.

The insertion procedure is presented below in the program, INSERTION:

INSERTION

The procedure adds a new element into the data lattice.

```
procedure INSERT (var Lattice: Table; key:integer);
        {accommodates a new item}
BEGIN
    with Lattice, Element do
        Begin
            size:=size+1; items [size]:=key {increasing
                lattice}
            IF (margin+height) = size THEN begin {and, if
                necessary}
            margin:=size; height:=height+1 end; {changing
                parameters}
            {setting starting values}
            position:=size; value:=key;
            MOVEIN {Lattice}
        End
END;
```

The insertion procedure appends a new element to the tail of a current set and then moves it inwards. Since with each swapping the element advances in either down or right direction, the whole procedure takes a number of steps no more than approximately proportional to (hereinafter indicated as $\sqrt{N}$.
$\alpha\sqrt{N}$).

The retrieval procedure is presented below in Pascal program, RETRIEVE.

RETRIEVE

Retrieve searches the lattice by confronting traversals:

```
function RETRIEVE (var Lattice: Table; key; integer):
    integer; {returns the position of a target key or 0,
    if not found}
var A, B, stepA, stepB: integer;
    {cursors and steps for 2D addressing from above and
    below}
var done: boolean;       {termination condition}
BEGIN
    with Lattice do
        Begin
        A:=margin; B:=margin+height-1; {setting guiding
            information}
        stepA:=height+1; stepB:=height; {initial cursors and
            steps}
        RETRIEVE:=0; done:=false;  {setting initial values}
        items[0]:=key; {to handle empty and one-element
            lattices}
            REPEAT
            IF (items[A]=key) or (items[B]=key) THEN done:=true
                {terminating with the key found or empty}
                                    ELSE
                                    begin
            IF (items [A+stepA]>key)  THEN begin
                {traversing from above}  A:=A-stepA+2; stepA:=stepA−1
                                    end
                                    ELSE begin
                                    A:=A+stepA; stepA:=stepA+1
                                    end;
            IF (items[B+stepB]>key)  THEN begin
                {traversing from below}  B:=B-stepB; stepB:=stepB−1
                                    end
                                    ELSE begin
                                    B:=B+stepB; stepB:=stepB+1
                                    end;
        (terminating on collision} IF A=B THEN done:=true
                                    end;
            UNTIL done;
                {assigning the position of the key, if found}
            IF (items[A]=key) THEN retrieve:=A;
            IF (items[B]=key) THEN retrieve:=B
        End
END;
```

This procedure employs two confronting traversals starting from the left and right margins. The right margin will be one step outside of the set, unless it coincides with the size of the set.

In the retrieval searching procedure with two confronting traversals, the worst case path is the border side of the triangular construction, i.e. about $$\sqrt{2 \cdot N}.$$

This is a half of the length of the worst case path in a one-traversal searching. The two-traversal procedure has a simple termination condition due to the corollary of coinciding paths: if unsuccessful, it stops when both traversals hit the same node. In comparison with a one-traversal search, this allows to eliminate the confusing operation of checking for the border line with a subsequent changing of the traversal routine. As a result, despite doubling the comparisons at each step, this two-traversal procedure operates faster than one-traversal procedures.

The realization of a navigational step in the developed procedure is simplified by using only a "greater than" comparison. Supported by two traversals, this procedure is very robust and reliable. Even with some distortions, it may prevalently produce the correct results. Therefore, its debugging requires a cautious attention. In the presented implementation, the initialization of search includes putting the target (key) element in the zero position of the items array. This allows the search to handle an empty structure and the case of an unsuccessful search in a one-element lattice. Also, the target (key) element in zero position may be useful as a sentinel in sequential search for further developments described hereinafter.

The procedure for deleting a specified element is presented below in the program, DELETE.

DELETE

Delete removes a specified element from the lattice:

```
procedure DELETE (var Lattice:Table; key:integer);
    (a specified element is removed, if found}
BEGIN
    with Lattice, Element do
        Begin
        position:=Retrieve(Lattice, key);
            {searching for a given key}
        IF position>0 THEN  {key is found}
            begin
            value:=items[size]; (retaining the last element)
            items[size]:=maxint; {updating the last element}
            IF (size=margin) THEN begin    {if necessary,}
                    height:=height-1;           {changing}
                    margin:=margin-height      {the parameters}
                    end;
            size:=size-1; {decreasing lattice size}
            IF position<=size THEN {key is to be adjusted}
                IF value>items [position] THEN
                                    MOVEOUT (Lattice)
                                    ELSE
                                    MOVEIN (Lattice)
            end
        End
END;
```

The procedure Delete includes two parts. First, if the element is found, this element has to be removed and the second, if the element has been removed, the remaining lattice elements have to be rearranged. The removal of an element is done by substituting it with the last element of the lattice. Depending on the value of the element, it is moved either inwards or outwards. This rearrangement takes no more than $O(\sqrt{N})$ steps. Since the retrieval has the same time complexity, the total time of the deletion will be $O(\sqrt{N})$.

Manipulations with the data items array involve various types of operations requiring content-addressable access. These manipulations include determining extrema, finding nearest neighbors, selecting keys from a certain range, providing an ordered retrieval and so on. In a content-addressable memory, all these operations could get effective hardware support, otherwise, these operations have to rely on less effective software tools. The lattice search technique offers a viable content-addressable operations with a square root performance. These content-addressable operations can be added to all common operations with lattice and are effective immediately.

Determining extrema in a dynamic set is a problem of a great importance whose solution is organized with a special data structure called priority queue. Considering a variety of solutions investigated by D. W. Jones in "An Empirical Comparison of Priority-Queue and Event Set Implications" COMMUNICATION OF THE ACM, Vol. 29, No. 4, pp. 300–311, 1986, it is apparent that the lattice search technique is among the simplest and has a rather high operational speed. It should be noted that using lattice search for a priority queue does not require the sophisticated mapping into a one-dimensional array and can be more efficient with a direct mapping into a two-dimensional array. Also, the priority queue operations would run slightly faster on a three-dimensional lattice. As a priority queue, the lattice structure has a drawback of instability, i.e. it does not automatically maintain the intrinsic ordering of identical keys.

The two confronting traversals, if terminated on collision, are equivalent to one complete traversal of the lattice. According to the corollary on nearest neighbors, this traversal will contact the immediate predecessor and successor of the target element. The presented retrieval procedure can be adapted to perform search for nearest neighbors. This can be done by picking up the closest, larger and smaller, values to the target element in the course of the traversal set up for termination on collision. It is possible to organize a traversal which will monitor the LUB and GLB of current positions, as A and B in FIG. 3. The values of all elements within the specified rectangular area are between GLB and LUB. Since the converse is not true, i.e. elements whose values are between GLB and LUB are not necessarily in this area, such an operation can provide a restricted selection.

Sorting in lattice structure can be done by repeated deletions of the smallest elements in the first position and readjustments of the structure. The time complexity of this procedure will be $O(N^{1.5})$. The advantage of the suggested mapping scheme is that it does not preclude using any other conventional array operations. In particular, ordering of the data items can be done most efficiently in place with the $O(N \cdot \log N)$ algorithm of heap-sort. From a certain aspect, the heap and lattice are similar in the sense that both of them operate using implicit structuring of the array.

The lattice structure provides some flexibility in merging and splitting the arrays. From the triangular construction presented in FIG. 2, it is possible to get a subset in the form of a "trapezoid." We can imagine that a part of this structure, a triangle adjacent to the lower left corner is removed and substituted with O's. Obviously, the remaining trapezoid remains operational. By splitting a sorted lattice structure into two halves we can get two operational parts. The lower triangle is operational immediately, the upper trapezoid requires some retouching. It is not necessary to fill in the whole removed triangle with 0, a boundary layer will suffice taking $O(\sqrt{N})$ operations. Under appropriate separation conditions such an operation can be reversed just by concatenation. The case of combining sorted lattices can be handled by ordinary merging taking O(N) operations. The simplest way of efficient splitting and merging of unordered lattices is through preliminary sorting. In some situations, using a general sorting algorithm may take an unacceptably long period of time when the system is barred from performing its normal searching and updating procedures. The lattice structure also offers a possibility to change ordering of its elements in incremental steps as a background activity.

The remarkable property of the lattice data structure is that it operates with "roughly ordered" arrays, i.e. with arrays which are to a certain extent close to total ordering. If the lattice structure were in the state of total ordering it could achieve the highest possible performance. Although maintaining the total ordering in dynamic case is not possible, this data structure has certain facilities for adaptation by going from a rough ordering to the total ordering in incremental steps. Each of these steps will take $O(\sqrt{N})$ operations and a sequence of these steps could eventually lead to the desired total ordering, not necessarily in optimal way. The significance of such an organization is that these incremental steps go from one allowable rough ordering state to another. If the system is interrupted in the course of these incremental adjustments, it has to wait only a relatively short time to complete a current step to be able to respond to a given request. Thus, the overall $O(\sqrt{N})$ performance is always guaranteed for all searching and maintenance operations.

Having described the information processing unit having content-addressable capabilities for retrieving data from a memory, it is recognized that those skilled in the art may make certain modifications and improvements within the scope of the invention as set forth above, shown in the drawings and set forth in the appended claims.

What is claimed is:

1. An information processing unit comprising:
   at least a first internal memory storing a set of data elements in a predetermined lattice structure said data lattice structure is at least partially ordered triangular lattice having the data elements sorted in an increasing order from left-to-right and from bottom-to-top;
   a first processor for searching for said target element by a first traversal of said data lattice structure from a first predetermined location;
   a second processor for searching for said target element by a second concurrent traversal of said data lattice structure from a second predetermined location displaced from said first predetermined location, said second traversal confronting said first traversal; and
   a traversal controller for generating a lattice search routine for locating said target element used by said first and second processor to execute said confronting first and second traversals of the data lattice structure.

2. The information processing unit of claim 1 wherein said triangular data lattice structure is stored as a one-dimensional array.

3. The information processing unit of claim 1 wherein said data lattice structure has a left margin and a right margin, said first processor initiates said first traversal from said left margin and said first traversal proceeds in right and down directions and wherein said second processor initiates said second traversal from said right margin and said second traversal proceeds in a left and up direction.

4. The information processing unit of claim 3 wherein each data element has a neighbor data element R to its right and a neighbor data element D displaced from said data element, said first processor has means for comparing the target element with said data elements D and R to determine the direction of said first traversal; and wherein each data element has a neighbor element L to its left and said data lattice structure and a neighbor element U displaced up from said data element, said second processor has means for comparing the target element with said data elements L and U to determine the direction of said second traversal.

5. The information processing unit of claim 4 wherein said first processor further includes logic means responsive to the comparison of said target data element with said data elements D and R for generating a first signal causing said first processor to direct said first traversal to the right when said data elements D and R are less than said target element, for generating a second signal causing said first processor to direct said first traversal diagonally when said data element D is less than the target element and said target element is less than said data element R, and for generating a third signal causing said first processor to direct said first traversal downwardly when said target element is less than data element D and data element R.

6. The information processing unit of claim 5 wherein said second processor further includes second logic means responsive to said comparison of said target element with said data elements U and L performed by said comparator means for generating a fourth signal causing said second processor to direct said second traversal to the left when said data elements U and L are greater than said target element, for generating a fifth signal causing said second processor to direct said second traversal diagonally to the left and up when said data element U is greater than the target element and said data element L is less than said target element, and for generating a sixth signal causing said second processor to direct said second traversal upwardly from said data element when said target element is greater than said data elements U and L.

7. The information processing unit of claim 6 further comprising a second memory storing processing instructions for said traversal controller and at least a third processor for extracting said processing instructions from said second memory interleaved with the access of said first and second processors to said first memory.

8. The information processing unit of claim 7 wherein said processing instructions stored in said second memory include pointers identifying specific locations in said first memory.

9. The information processing unit of claim 8 further comprising an interface processor connecting said traversal controller with a utilization device.

10. A method for content addressing to find a target data element in a data lattice structure having a left margin at one end and a right margin at the other end, each data element of the data lattice structure has a neighbor data element, R, to its right, a neighbor data element, L, to its left, a data element, U, above and a data element D below it, said method comprising the steps of:

accessing a first data element at said left margin;

comparing said target data element to the neighbor data elements D and R of said first data element to identify the data element R as the next data element to be accessed when the data elements D and R are less than said target data element, to identify a data element diagonally displaced from said first data element as the next data element to be accessed when said first data element is less than the target data element and said target data element is less than said data element R and to identify the data element D as the next data element to be accessed when said target data element is less than said data element R and said data element D;

substituting said next data element to be accessed for said first data element;

repeating said step of comparing said target data element to the neighbor data elements D and R of said first data element, using said next data element to be accessed as said first data element and said step of substituting;

accessing a second data element at said right margin;

comparing said target data element to said neighbor data elements L and U of said second data element to identify the data element L as the next data element to be accessed when said data elements U and L are greater than said target data element, to identify a data element diagonally displaced from said second data element as the next data element to be accessed when said data element U is greater than said target data element and said data element L is less than said target data element, and to identify said data element U as the next data element to be accessed when said target data element is greater than said data elements U and L;

substituting said next data element to be accessed for said second data element;

repeating said step of comparing said target data element to the neighbor data elements L and U of said second data element using said next data element to be accessed as said second data element and said step of substituting; and terminating said steps of comparing and substituting when said target data element is found.

11. The method of claim 10 wherein said target data element is not in said data lattice structure, said step of terminating includes the step of terminating said steps of comparing and substituting when the closest neighboring data element to said target element is found.

* * * * *